UNITED STATES PATENT OFFICE.

SOLOMON W. KIRK, OF PHILADELPHIA, PENNSYLVANIA, ASSIGNOR OF ONE-FOURTH TO REES WELSH, OF SAME PLACE.

SEPARATING WAX FROM PARAFFINE-OIL.

SPECIFICATION forming part of Letters Patent No. 267,752, dated November 21, 1882.

Application filed August 22, 1882. (No specimens.)

*To all whom it may concern:*

Be it known that I, SOLOMON W. KIRK, of the city and county of Philadelphia, in the State of Pennsylvania, have invented a certain new and useful Improvement in Separating Wax from Paraffine-Oil, of which improvement the following is a specification.

The object of my invention is to expedite and facilitate the separation of wax from paraffine-oil, and to enable the employment of ice or freezing mixtures to be dispensed with in the operation. To this end my improvement consists in adding paraffine-wax to the crude product of petroleum distillation containing oil and paraffine prior to the filtration or pressing of the latter, as hereinafter more fully set forth.

To carry out my invention I take the crude paraffine distillate of petroleum and thoroughly incorporate therewith a small proportion of "scale-wax," which has been previously reduced to a fluid condition by heat. The exact quantity of wax which is to be added is not material, as the same may be varied at the discretion of the operator. Proportions of from fifty to one hundred pounds of wax and fifty to one hundred gallons of distillate, respectively, may however be indicated as having been found desirable in practice. The mixture is then allowed to stand for, say, ten to twelve hours, when it will be found that the wax contained in the distillate has united with the added wax and become sufficiently hard to admit of the separation of the oil by pressure and filtration through bags in the usual way.

A material economy in time and cost is attained by the use of my invention, and, inasmuch as the wax which has been added is recovered with that extracted from the distillate, no waste of material is involved.

I claim as my invention and desire to secure by Letters Patent—

The improvement in the art of separating wax from paraffine-oil, which consists in the addition of paraffine-wax to the crude paraffine distillate of petroleum, substantially as set forth.

S. W. KIRK.

Witnesses:
J. SNOWDEN BELL,
GEO. T. KELLY.